United States Patent [19]

Tamers

[11] 4,137,295
[45] * Jan. 30, 1979

[54] CARBIDE PRODUCTION USING MOLTEN METALS AS HEAT SOURCE

[76] Inventor: Murry A. Tamers, Nova University, Ft. Lauderdale, Fla. 33314

[*] Notice: The portion of the term of this patent subsequent to Feb. 22, 1994, has been disclaimed.

[21] Appl. No.: 789,075

[22] Filed: Apr. 20, 1977

[51] Int. Cl.² .................... C01B 31/30; C01B 31/32
[52] U.S. Cl. .................................. 423/439; 423/442
[58] Field of Search ........ 423/439, 441, 442, DIG. 12

[56] References Cited

U.S. PATENT DOCUMENTS

| | | | |
|---|---|---|---|
| 1,019,002 | 2/1912 | Acker | 423/439 |
| 1,051,303 | 1/1913 | Acker | 423/382 |
| 1,072,373 | 9/1913 | Acker | 423/439 |
| 1,719,970 | 7/1929 | Eldridge | 423/442 |
| 1,775,713 | 9/1930 | Baily | 423/439 |
| 1,996,185 | 4/1935 | Wulff | 423/415 A |
| 2,535,217 | 12/1950 | Li et al. | 423/53 |
| 4,009,219 | 2/1977 | Tamers | 423/439 |

Primary Examiner—O. R. Vertiz
Assistant Examiner—Gary P. Straub

[57] ABSTRACT

A process for carrying out highly endothermic chemical reactions wherein a reactive metal or a compound thereof is reacted with a source of carbon to form a carbon-containing derivative, preferably a carbide, in the presence of a molten metal. The sensible heat of the molten metal supplies the energy necessary for the reaction.

7 Claims, 4 Drawing Figures

CARBIDE PRODUCTION USING MOLTEN METALS AS HEAT SOURCE

This invention relates to a process for carrying out highly endothermic chemical reactions, and particularly chemical reactions wherein a reactive metal is contacted with a coreactant in a highly endothermic reaction.

With the ever-increasing shortage of energy, it becomes increasingly important to carry out endothermic reactions more efficiently. Particularly is that so where highly endothermic chemical reactions are used to produce, from renewable resources, organic compounds heretofore obtained from petroleum.

In my copending application, Ser. No. 623,943, filed Oct. 20, 1975, and U.S. Pat. No. 4,009,210, issued Feb. 22, 1977, there are described processes for making petroleum derivatives, notably acetylene, benzene and their derivatives from renewable carbon sources. In the preferred practice of the processes described in the copending application and patent, lithium or a like reactive metal is contacted with a carbon source an reacted therewith in a highly endothermic reaction to produce lithium carbide. The lithium carbide, in turn, is hydrolyzed with water to form acetylene useful for a number of industrial processes. As is described in detail in my U.S. Pat. No. 4,009,210, the acetylene produced in this manner can be employed in the total synthesis of benzene, an important organic compound normally derived from petroleum, used in other reactions, or used as such.

One of the features of the processes of the type described in my copending application and patent which makes them particularly attractive is that the carbon source can be any of a wide variety of materials. While coal, coke and other fossil fuel chars are suitable as the carbon source, use can also be made of renewable carbon sources, such as agricultural materials including animal wastes, forestry products, including leaves, twigs, bark, wood chips, wood and charcoal, household wastes as well as naturally occurring metal carbonates such as limestone, dolomites and the like and carbon dioxide and carbon monoxide.

The primary disadvantage of processes of the type described above stem from the fact that they consume extensive amounts of energy, and thus are quite expensive to carry out.

It is accordingly an object of the present invention to provide a method for carrying out highly endothermic chemical reactions which overcomes the foregoing disadvantages.

It is a more specific object of this invention to provide a method for carrying out highly endothermic chemical reactions in which a reactive metal is contacted with a renewable resource to provide, in a highly endothermic reaction, organic compounds normally derived from petroleum.

It is a more specific object of the invention to provide a method for carrying out endothermic chemical reactions in which the energy necessary for the reaction is supplied efficiently and economically.

These and other objects and advantages of the invention will appear more fully hereinafter, and, for purposes of illustration and not of limitation, embodiments of this invention are shown in the accompanying drawings wherein.

The concepts of the present invention reside in a process for carrying out chemical reactions in which a reactive metal is contacted with a coreactant, preferably in the form of a source of carbon, to produce useful materials efficiently and economically in a highly endothermic reaction. In accordance with the practice of the invention, the heat necessary for the reaction is supplied by a molten metal, either the reactive metal itself or a different metal in the molten state which is maintained in intimate contact with the reactive metal to supply the necessary endothermic heat of reaction of effect the chemical reaction between the reactive metal and the carbon source.

It has been found that, with the use of a metal in the molten state, the heat necessary for the reaction between a reactive metal and a carbon source can be supplied efficiently and economically, and without the need to utilize excess amounts of energy which are otherwise in short supply, namely petroleum and its derivatives.

Figure 1:
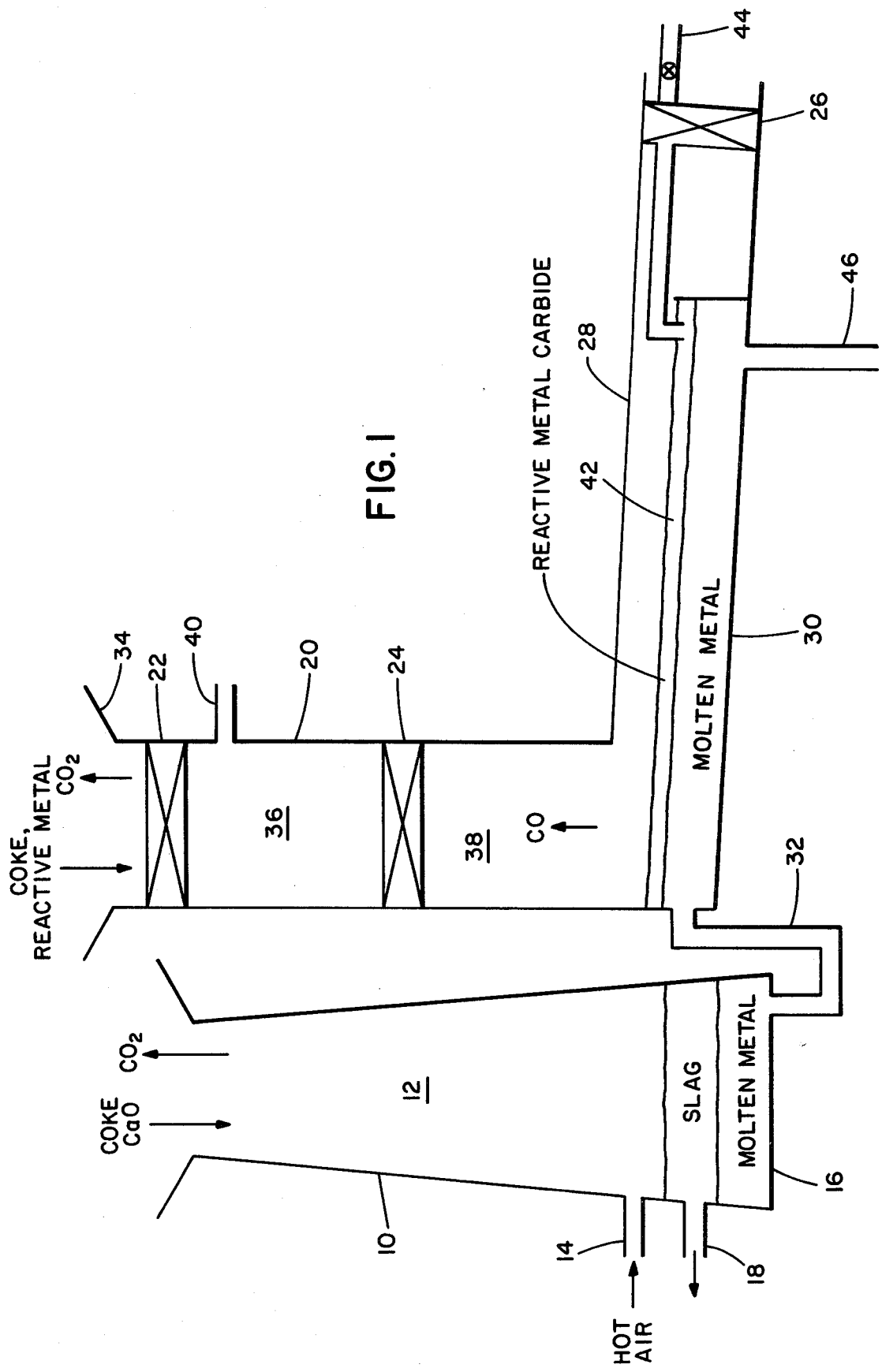
FIG. 1 is a schematic illustration of apparatus suitable for use in the practice of this invention to effect an endothermic chemical reaction between a reactive metal and a carbon source.

In accordance with one preferred embodiment of the invention, a reactive metal is contacted with a carbon source in the presence of a molten metal different from the reactive metal. The endothermic heat necessary to effect the reaction between the reactive metal and the carbon source is thus supplied by the combustion necessary to maintain the molten metal in the hot molten state. A process of that type is broadly illustrated in FIG. 1 of the drawing. As shown in this figure, use is made of a conventional blast furnace 10 which is used to maintain in the molten state a metal such as iron. However, other common metallurgical heating techniques are also useable and other metals, for example alloys, copper, etc., can be employed. The details of the blast furnace 10 or other metallurgical heating devices are, of themselves, conventional and form no part of the present invention. As is illustrated in FIG. 1, the blast furnace 10 includes a combustion chamber 12 into which a source of fuel such as coke is supplied. A source of an oxidizing gas such as air is introduced through an appropriate duct 14 to burn the fuel source within the combustion chamber 12 and maintain in the bottom of the blast furnace a layer 16 of molten metal such as molten iron. Slag formed during the process is removed via an appropriate effluent line 18. Carbon dioxide produced by the combustion exits from the top of the furnace in accordance with well-known principles.

Used in conjunction with the blast furnace 10 is a reactor 20 in which the reactive metal is contacted with the carbon source. In the embodiment illustrated in FIG. 1, the reactor 20 is formed of a generally vertically disposed reactor equipped with vacuum locks 22, 24 and 26 to maintain the reactor at the desired pressure. The reactor also includes a generally horizontal portion 28 communicating with the vertical portion 20, the horizontal portion 28 being adapted to contain molten metal 30 supplied to it by way of a supply line 32 communicating with the layer 16 of molten metal maintained in the lower portion of the blast furnace 10.

In the use of the reactor 20, a carbon source, illustrated in the drawing as coke, and a reactive metal are introduced to the reactor 20 through a hopper 34 located near the top of the reactor. The coke and the reactive metal are passed into the reactor 20 through the first vacuum lock 22 into a central chamber 36 and through the second vacuum lock 24 to a lower chamber 38 in which the reactive metal and the carbon source (coke) are intimately contacted with the layer 30 of molten metal. The heat supplied by the molten metal is sufficient to promote the highly endothermic reaction between the reactive metal and the carbon source to form a reactive metal carbide and carbon monoxide. The carbon monoxide, in the gaseous phase, rises within the vertical portion 20 and is there converted to carbon dioxide by contact with the reactive metal which can also be introduced at or near the top of the reactor along with the source of carbon. The carbon dioxide thus formed is removed via the vacuum line 40 and/or vented from the top of the reactor 20.

The reactive metal carbide, whether in the solid or liquid phase, is thus formed as a layer 42 on the molten metal 30. It is continuously removed via exit pipe 44 through the vacuum lock 26 for hydrolysis to form acetylene.

The molten metal 30 can be removed by way of the molten metal effluent line 46. The effluent molten metal removed from the horizontal portion of the reactor 28 can thus be cooled to form ingots of the molten metal, or it can be recycled to the combustion chamber 12 where it is heated and used over again by passage from the layer 16 of molten metal through the line 32 to the horizontal portion of the reactor 28.

The reaction between the reactive metal and the carbon source can be carried out under the conditions described in my copending application referred to above. The reactive metals preferred in the use of this invention are alkali metals and alkaline earth metals, with lithium and calcium being preferred. As used herein, the term "reactive metal" embraces not only lithium and calcium in the metallic state, but also their corresponding oxides, hydroxides, and carbonates.

It is important that the reaction in the reactor 20 be carried out under non-oxidizing conditions to insure the formation of the reactive metal carbide. For this purpose, it is frequently convenient to carry out the reaction under vacuum, as by drawing a vacuum through the exit line 40 to maintain the reactor 20 under a reduced pressure. Alternatively, use can be made of an inert gas or a reducing gas atmosphere so long as the atmosphere does not interfere with the reaction of the reactive metal with the carbon source to form the reactive metal carbide.

The molten metal utilized in the practice of this invention is preferably iron, but can also be other relatively low-melting metals, including copper and alloys of copper and iron. It is generally preferred that the molten metal be one which remains in a molten state at temperatures above 1400° C, and preferably 1300° C.

The relative proportions of the feed material supplied to the process are not critical and can be varied within relatively wide limits. In the blast furnace 10, use is made of sufficient quantities of coke to supply the necessary heat to maintain the metal layer 16 in the molten state for use in the reactor 20. In the reactor 20, it is generally preferred to employ an excess of coke or other suitable carbon source to insure that all of the reactive metal introduced to the reactor 20 is converted to its corresponding carbide.

Figure 2:
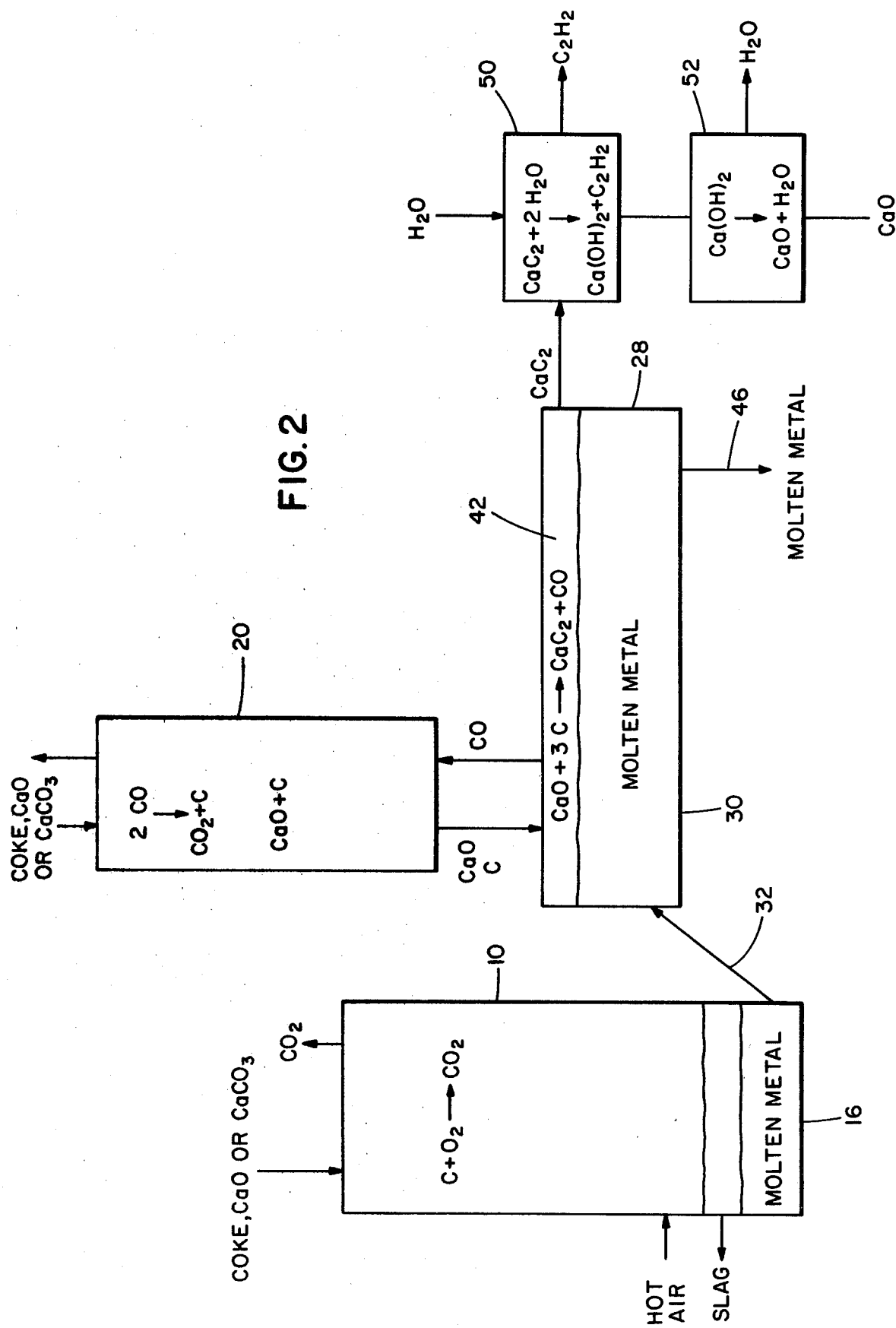
FIG. 2 is a schematic illustration of a process embodying the concepts of this invention wherein calcium compounds are reacted with a carbon source to produce acetylene.

FIG. 2 is a schematic diagram of the apparatus of FIG. 1, used to produce acetylene using calcium, in the form of its oxide or carbonate, as the reactive metal. As is shown in this figure, coke and calcium oxide (i.e., lime) or calcium carbonate (i.e., limestone) are introduced to the furnace 10 where they are contacted with hot air to burn the coke and thus form carbon dioxide and heat used to maintain the metal 16 in the molten state at a temperature of about 1900° C.

Molten metal from the bottom of the furnace 10 is drawn manometrically, by reason of the vacuum existing in the reactor 20, to the horizontal portion 28 thereof. Introduced to the top of the vertical portion 20 is coke and calcium oxide or carbonate which passes downwardly through the reactor to the layer 30 of molten metal. The calcium carbonate converts to the oxide through heat transferred by outgoing carbon dioxide or monoxide. The calcium oxide finally reacts with the carbon to form calcium carbide and carbon monoxide, the heat used for that reaction being supplied by the molten metal. Carbon monoxide continuously passes upwardly through the vertical portion of the reactor where it is decomposed to form carbon dioxide and carbon, the carbon dioxide being vented from the system and the carbon passing downward again to the molten metal.

The calcium carbide thus formed on the surface of the molten metal is separated therefrom and passed to a hydrolysis reactor 50 where it is contacted with water to form calcium hydroxide and acetylene. The acetylene is removed as a gas, and can be used as such or as an intermediate in the production of further chemical derivatives in accordance with known techniques. The calcium hydroxide can then be passed to a dryer 52 from which water is removed to form calcim oxide; the latter recycled as feed to the vertical portion 20 of the reactor whereby no calcium is theoretically consumed in the process. Alternatively, the calcium hydroxide issuing from the hydrolysis reactor 50 can be disposed of as a by-product or recycled to the reactor 20 where the heat present in the reactor 20 serves to remove water and convert the calcium hydroxide to calcium oxide.

Figure 3:
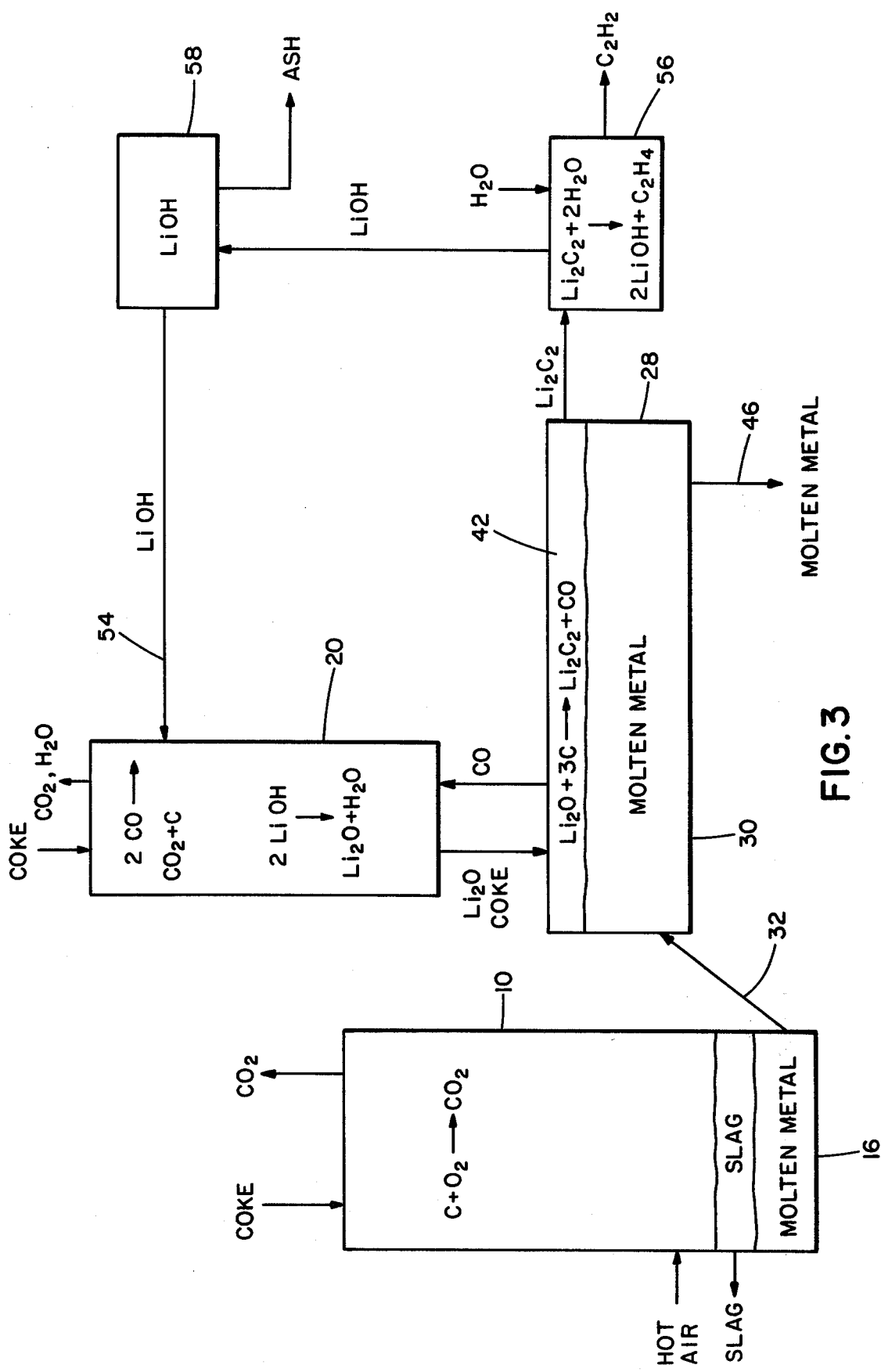
FIG. 3 is a schematic diagram of the process of this invention wherein lithium compounds are reacted with a carbon source to produce acetylene.

The use of this concept of the invention to produce acetylene using lithium as the reactive metal is schematically depicted in FIG. 3 of the drawing. As in the case of FIG. 2, the furnace 10 is supplied with coke as a source of fuel to maintain the metal 16 in the molten state which is then passed via line 32 to the molten metal bath 30 in the horizontal portion 28 of the reactor.

To the top of the vertical portion 20 of the reactor, there is supplied coke and lithium hydroxide, the latter being fed via line 54. The elevated temperature existing in the reactor 20 serves to dehydrate the lithium hydroxide and thus form lithium oxide and water vapor, the latter being vented from the system. The carbon, in the form of coke or other source of carbon, and lithium oxide pass downwardly through the reactor 20 and contact each other on the surface of the molten metal 30 where they react to form lithium carbide and carbon monoxide. Again, the endothermic heat necessary to initiate the reaction is supplied by the molten metal 30.

The carbon monoxide formed as a result of this reaction is passed upwardly through the vertical portion 20 of the reactor where it loses its heat and then is decomposed to form carbon dioxide and carbon, the former being eliminated from the system. The lithium carbide, in the molten state at the temperature of the molten metal, floats on the surface of the molten metal and is removed from the horizontal portion 28 of the reactor and passed to the hydrolysis reactor 56 where it is contacted with water to form lithium hydroxide and acetylene. The lithium hydroxide is then passed, after separation of the gaseous acetylene, to a separator 58 from which ash is separated from the lithium hydroxide. That hydroxide is then recycled via line 54 to the reactor 20.

As can be seen in both FIGS. 2 and 3, the molten metal can be, if desired, simply recycled via line 46 to the furnace 10 to operate the process without the consumption of molten metal. Alternatively, the molten metal can be continuously removed from the reactor portion 28 and formed into ingots. When operating in accordance with that mode, it is, of course, necessary to supply metal ore to the furnace 10 to continuously replenish the supply of metal removed. Similarly, in both the embodiments illustrated in FIGS. 2 and 3, the reactive metal, calcium and lithium, respectively, are not consumed in the process and can be reused since each is regenerated after hydrolysis of the corresponding carbide to form acetylene.

Figure 4:
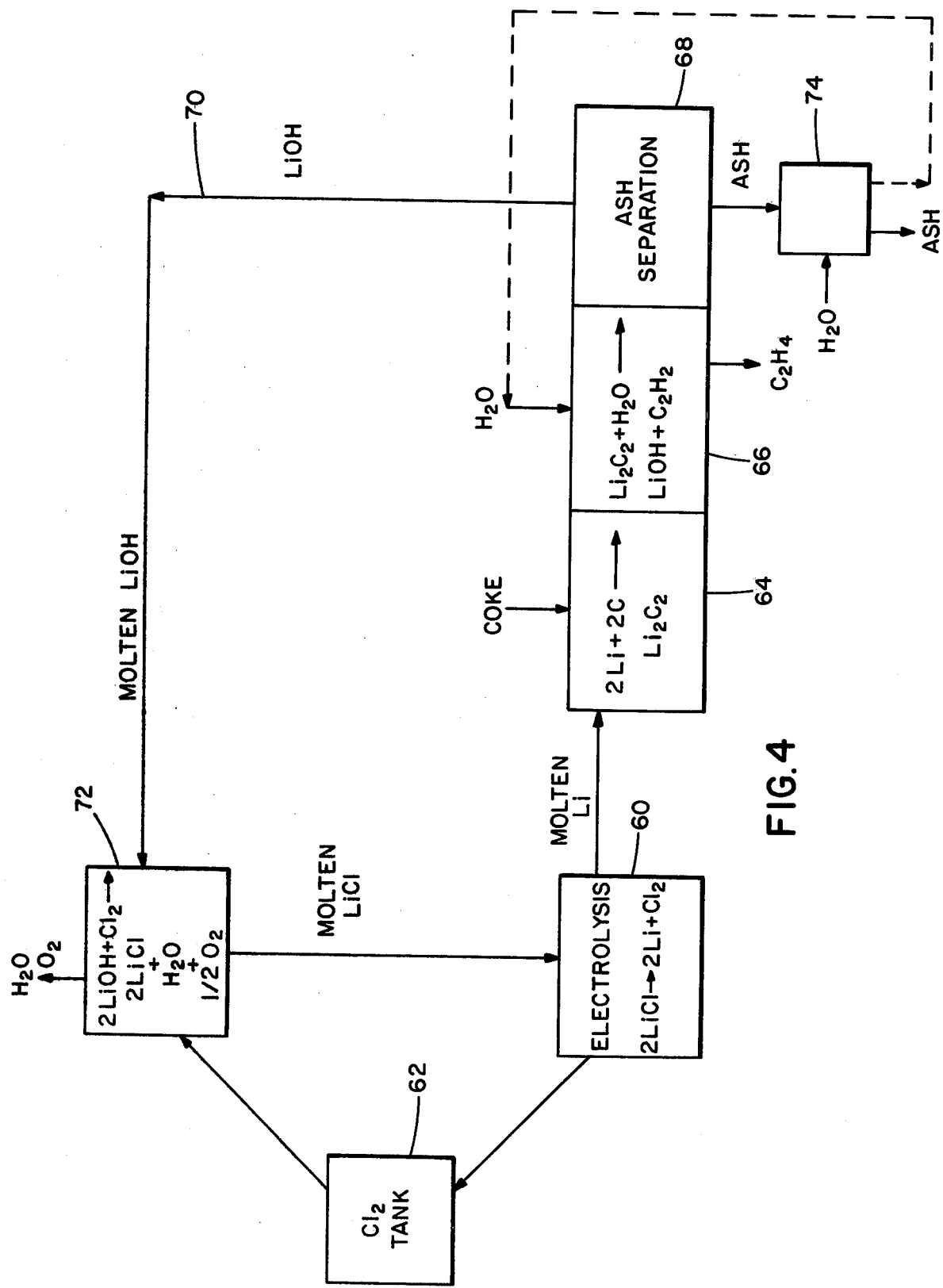
FIG. 4 is a schematic diagram of an alternative process embodying the concepts of this invention wherein lithium is reacted with a carbon source to produce acetylene.

An alternative embodiment of the invention is shown in FIG. 4 of the drawing, a schematic illustration of the process wherein the reactive metal itself is in the molten state. In the process illustrated in this figure, lithium chloride is continuously supplied to an electrolysis reactor in which lithium chloride is subjected to fused salt electrolysis to drive the highly endothermic reaction that forms molten lithium and chloride. The chlorine is continuously passed to a holding tank 62 whereas the molten lithium is passed to a reactor 64 where it is contacted, in the molten state, with a source of carbon. The sensible heat of the molten lithium is increased slightly in order to initiate the exothermic reaction of lithium with carbon to form lithium carbide. The latter is then passed to a hydrolysis reactor 66 where it is contacted with water to form lithium hydroxide and acetylene. After removal of the acetylene gas, the molten lithium hydroxide remaining is then passed to a separator 68 where the lithium hydroxide, still in the liquid state, is separated, as by decantation, filtration or centrifugation, from the solid ash.

The lithium hydroxide thus regenerated is passed via line 17 to a chlorination reactor 72 where it is contacted with elemental chlorine to form lithium chloride, water and elemental oxygen, the chlorine used being supplied by the chlorine holding tank 62. The lithium chloride produced in the chlorinator 72 is then returned to the electrolysis reactor 60 for reuse. The ash separated from the lithium hydroxide in the separator 68 is washed with water to remove small amounts of lithium hydroxide entrained with the ash in washing apparatus 74. From that, the ash is discarded whereas the water containing trace amounts of lithium hydroxide can be recycled to the hydrolysis reactor 66 to return the dissolved lithium hydroxide to the system. In this way, losses of lithium from the system can be kept at a minimum.

In the illustrative embodiments described above, it will be noted that the heat necessary for the endothermic reaction involving the reactive metal with, for example, a source of carbon is supplied in each instance, by a molten metal, either the reactive metal itself in the case of the embodiment illustrated in FIG. 4, or a different molten metal, in accordance with the embodiment illustrated in FIGS. 1-3. The use of the sensible heat of the molten metal thus provides significant energy savings and utilizes relatively plentiful fuel sources.

The acetylene produced can be used as such, or it can be subjected to chemical reactions, including polymerization, hydrogenation, chlorination, hydrochlorination, oxychlorination and the like to produce other valuable organic compounds such as ethylene, ethane, 1,4--butanediol, vinyl chloride, benzene and derivatives thereof.

While the invention has been described above with reference to the use of lithium and calcium as reactive metals, it will be understood that other reactive metals of the type described above and in my copending application can be used as well.

Having described the basic concepts of the present invention, reference is now made to the following examples which are provided by way of illustration, and not by way of limitation, of the practice of the invention.

EXAMPLE 1

This example illustrates the process of this invention, using calcium oxide as the reactive metal compound.

Using apparatus of the sort illustrated in FIGS. 1 and 2, coke and lime are supplied to a blast furnace containing molten iron maintained at 1900° C in the lower portion thereof. The coke and hot air supplied to the furnace 10 are maintained at such a rate that the temperature of 1900° C at the bottom of the furnace is maintained with the carbon dioxide escaping from the top of the furnace being approximately 100° C. The feed rate of the coke to the furnace is maintained at approximately 700 parts by weight per day.

Supplied to the reactor 20 are 600 parts by weight of coke per day along with 900 parts by weight of calcium oxide per day. The calcium oxide and coke are passed downwardly through the reactor, the vertical portion 20 of which has a temperature gradient ranging from about 100° C at the upper portion and about 800° C above the level of the molten metal. The calcium oxide and carbon are intimately contacted on the surface of the molten metal which is maintained at 1900° C and are there reacted to form calcium carbide and carbon monoxide. The carbon monoxide is passed upwardly through the vertical portion 20 while the calcium carbide in the solid phase, is continuously removed from the surface of the molten metal layer 30 at a rate of about 1000 parts by weight per day.

The calcium carbide removed from the horizontal portion 28 is passed to a hydrolysis reactor 50 where it is contacted with water. Approximately 400 parts by weight of acetylene are liberated per day.

The calcium hydroxide produced in the hydrolysis reaction is then dried to form calcium oxide which is removed or recycled to the vertical portion 20 of the reactor.

EXAMPLE 2

This example illustrates the use of lithium, in the form of lithium hydroxide, as the reactive metal in the practice of this invention.

Using apparatus of the sort illustrated in FIGS. 1 and 3 of the drawing, molten iron is maintained in a furnace at a temperature of about 1900° C.

There are supplied to the top of the vertical portion 20 of the reactor 600 parts by weight per day of coke and 800 parts by weight per day of molten lithium hydroxide. The vertical portion 20 of the reactor has a temperature gradient over its length, ranging from 100° C at its top to about 800° C above the level of the molten metal 30. The lithium hydroxide is dehydrated within the vertical portion 20 of the reactor to form lithium oxide which is then passed along with the coke to the surface of the layer 30 of molten metal where the coke reacts with the lithium oxide to form lithium carbide and carbon monoxide, the latter passing upwardly and decomposing into carbon dioxide and carbon.

The lithium carbide formed in the reaction is continuously removed at a rate of about 400 parts by weight per day. The lithium carbide thus removed from the molten iron layer 30 is cooled and contacted with water in the hydrolysis chamber 56 to form acetylene. The lithium hydroxide formed as a result of that reaction, heated to a temperature of 450° C, is in the molten state and is separated from the solid ash in the separator 58 for recycling to the vertical portion 20 of the reactor.

In both Examples 1 and 2, a pressure of less than about 5 mm of mercury is maintained in both the vertical and horizontal portions, 20 and 28, respectively, of the reactor, the vacuum being maintained by a steam aspirator or other vacuum generator in accordance with well-known engineering principles.

EXAMPLE 3

This example illustrates the electrolysis technique described in FIG. 4 of the drawing to produce acetylene, using lithium as the reactive metal.

Using an electrolytic cell of the type described in U.S. Pat. No. 3,085,968, the disclosure of which is incorporated herein by reference, lithium chloride is subjected to electrolysis to form molten lithium and chlorine gas at a temperature of about 450° C. The lithium metal thus formed collects on top of the molten salt contained in the electrolytic cell and is continuously removed to a carbon reactor where the molten lithium, raised to a temperature of about 850° C, is contacted with coke. The sensible heat of the molten lithium, produced as a by-product of the electrolysis reaction, can initiate the reaction between the lithium metal and the carbon to form lithium carbide. Lithium carbide is cooled and removed to a hydrolysis reactor. The lithium carbide reacts with the water supplied to the hydrolysis reactor to form acetylene, which is removed as gas, and lithium hydroxide remains. The lithium hydroxide is heated to about 450° C, where the lithium hydroxide, in the molten state, is removed, as by centrifugation and recycled to a chlorinator 72. The ash remaining after removal of the lithium hydroxide, containing principally oxides and sulfides of calcium, silicon, aluminum and iron, is washed, the wash water being recycled to the hydrolysis reactor.

The lithium hydroxide removed in the molten state from the ash separator 68 is then contacted with gaseous chlorine in the chlorinator 72 to form lithium chloride, water vapor and oxygen in a highly exothermic reaction. The water vapor and oxygen are vaporized from the system and lithium chloride in the molten state is recycled to the electrolysis cell.

In the process of this example, it is sufficient that only the reactor wherein the lithium is contacted with the coke be maintained either under a vacuum or an inert gas blanket. For reasons of economy, however, it is sometimes preferable to contact the lithium carbide with water under a reduced pressure since that procedure facilitates the separation of the gaseous acetylene from the reaction mixture.

It will be understood that various changes and modifications can be made in the details of procedure, formulation and use without departing from the spirit of the invention, especially as defined in the following claims.

I claim:

1. A process for producing carbides of reactive metals comprising:
   (a) forming, in a first reaction zone, a molten metal selected from the group consisting of iron and copper by combustion of a fuel,
   (b) passing the molten metal from the first reaction zone to a second reaction zone,
   (c) supplying to said second zone a reactive metal source selected from the group consisting of alkali metals and alkaline earth metals and the carbonates, oxides and hydroxides thereof and a carbonaceous fuel wherein the sensible heat of the molten metal supplies the heat required to react said reactive metal source with said fuel to form a carbide of the reactive metal, which floats on the surface of the molten metal and
   (d) separating the metal carbide and the molten metal.

2. A process as defined in claim 1 wherein the reactive metal source is contacted with the source of carbon under non-oxidizing conditions.

3. A process as defined in claim 1 which includes the step of hydrolyzing the carbide to form acetylene.

4. A process as defined in claim 1 wherein the reactive metal is calcium.

5. A process as defined in claim 4 which includes the step of hydrolyzing calcium carbide, formed by reaction between the calcium oxide and the source of carbon, to form acetylene, and separating the acetylene thus formed from calcium hydroxide.

6. A process as defined in claim 1 wherein the reactive metal is lithium.

7. A process as defined in claim 6 which includes the step of hydrolyzing lithium carbide formed by reaction of lithium with the said fuel to form acetylene and lithium hydroxide, separating the acetylene, separating lithium hydroxide from the ash and recycling the lithium hydroxide to step (c) wherein the lithium hydroxide is first dehydrated to lithium oxide which then reacts with the carbonaceous fuel to form lithium carbide.

* * * * *